US011519308B2

(12) United States Patent
Jonsson et al.

(10) Patent No.: US 11,519,308 B2
(45) Date of Patent: Dec. 6, 2022

(54) FLUID DRAINAGE TOOL

(71) Applicant: Volvo Car Corporation, Gothenburg (SE)

(72) Inventors: Jakob Jonsson, Gothenburg (SE); Thomas Backebrant, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 295 days.

(21) Appl. No.: 16/866,634

(22) Filed: May 5, 2020

(65) Prior Publication Data

US 2021/0348531 A1 Nov. 11, 2021

(51) Int. Cl.

*F01M 11/04* (2006.01)
*B25B 27/00* (2006.01)
*F01P 11/06* (2006.01)
*B09B 3/00* (2022.01)
*B09B 101/02* (2022.01)

(52) U.S. Cl.

CPC ............ *F01M 11/045* (2013.01); *B09B 3/00* (2013.01); *B25B 27/0042* (2013.01); *F01M 11/0458* (2013.01); *F01P 11/06* (2013.01); *B09B 2101/02* (2022.01)

(58) Field of Classification Search

CPC .... F01M 11/045; F01M 11/0458; B09B 3/00; B09B 2101/02; B25B 27/0042; F01P 11/06

See application file for complete search history.

(56) References Cited

U.S. PATENT DOCUMENTS

| | | | | |
|---|---|---|---|---|
| 299,532 A * | 6/1884 | Fitch | ....................... | F04F 10/00 604/128 |
| 6,199,578 B1 | 3/2001 | Clark, II | | |
| 2020/0101920 A1* | 4/2020 | Bartel | .................. | A01D 34/828 |

FOREIGN PATENT DOCUMENTS

| | | |
|---|---|---|
| CN | 102980017 B | 5/2015 |
| CN | 205131211 U | 4/2016 |
| CN | 105835992 B | 7/2019 |
| EP | 0720688 B1 | 3/2001 |

* cited by examiner

*Primary Examiner* — Jacob M Amick
*Assistant Examiner* — Charles J Brauch
(74) *Attorney, Agent, or Firm* — Clements Bernard Walker; Christopher L. Bernard

(57) ABSTRACT

A fluid drainage tool and method for utilizing the same is disclosed. The fluid drainage tool includes one or more pairs of vacuum members and a mechanical clamping mechanism. The mechanical clamping mechanism is coupled to the one or more pairs of vacuum members and is adapted to move the one or more pairs of vacuum members between an unclamped configuration and a clamped configuration. In the unclamped configuration, a gap formed by each of the one or more pairs of the vacuum members is larger than an original outer diameter of a pliable tube. In the clamped configuration, the gap is smaller than the original outer diameter of the pliable tube. In the clamped configuration, the one or more pairs of vacuum members compresses the pliable tube and generates a suction force within the pliable tube when translated along the pliable tube.

20 Claims, 5 Drawing Sheets

FLUID DRAINAGE TOOL

TECHNICAL FIELD

The present disclosure relates generally to the automotive and vehicle service fields. More particularly, the present disclosure relates to a fluid drainage tool and a methods for initiating the self-evacuation of a fluid from a fluid container of a vehicle.

BACKGROUND

During vehicle service, fluids, such as washer fluid, brake fluid, oil, petrol, diesel, and the like, are often drained from their respective fluid containers. This is particularly important when the container needs to be removed from the vehicle and doing so with the fluid therein would require a person to lift too much weight or risk a spill. Such instances would require the use of a lifting tool at all service stations, for example, which may be impractical.

While some fluid containers are accessible from underneath a vehicle, and thus, can include a valve or plug at the bottom that allow the fluid to be drained into a separate container positioned underneath the valve or plug, not all fluid containers are accessible from underneath the vehicle. A pump can be used to draw the fluids out of the respective containers. However, a pump can be expensive and difficult to move, among other things, and thus may not be practical for removing the fluids from the respective containers.

Self-evacuation can also be used to draw the fluids out of the respective containers, however, self-evacuation requires that the fluid flow is initiated, after which, the fluid will flow from the container. This is sometimes done via a very dangerous mouth-based "sucking" procedure, which is obviously not desirable.

The above-described background relating to vehicle service and fluid drainage from vehicle containers is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides a fluid drainage tool for initiating a fluid flow through a pliable tube. In particular, the fluid drainage tool includes at least one pair of vacuum members configured to move between an unclamped configuration and a clamped configuration by a mechanical clamping mechanism. The pair of vacuum members compresses the pliable tube in the clamped configuration such that, translating the pair of vacuum members generates a suction force within the pliable tube. The suction force generated within the pliable tube draws fluid out of a container at an end of the pliable tube to initiate a self-evacuation of the fluid from the container, such as by drawing the fluid into the pliable tube beyond a high point in the pliable tube next to the container. The fluid is then drawn out of the container through the pliable tube, such as via siphoning, for self-evacuation.

In one exemplary embodiment, the present disclosure provides a fluid drainage tool for initiating a fluid flow through a pliable tube. The fluid drainage tool includes one or more pairs of vacuum members and a mechanical clamping mechanism. The one or more pairs of vacuum members are configured to move between an unclamped configuration and a clamped configuration and are adapted to receive the pliable tube in a gap formed thereby. The mechanical clamping mechanism is coupled to the one or more pairs of vacuum members and is adapted to move the one or more pairs of vacuum members between the unclamped configuration and the clamped configuration. In the unclamped configuration, the gap formed by each of the one or more pairs of the vacuum members is larger than an original outer diameter of the pliable tube. In the clamped configuration, the gap formed by each of the one or more pairs of the vacuum members is smaller than the original outer diameter of the pliable tube. When the one or more pairs of vacuum members is moved from the unclamped configuration to the clamped configuration, the pliable tube is compressed by the one or more pairs of vacuum members. In the clamped configuration, the one or more pairs of vacuum members is adapted to be translated along a length of the pliable tube, thereby generating a suction force within the pliable tube.

In one embodiment, the fluid drainage tool further includes one or more pairs of guide members disposed adjacent to the one or more pairs of vacuum members. The one or more pairs of guide members are configured to move between the unclamped configuration and the clamped configuration. In the clamped configuration, each of the one or more pairs of guide members defines a gap that is partially or wholly larger than the gap defined by each of the one or more pairs of vacuum members.

Optionally, each of the guide members of the one or more pairs of guide members defines an annular groove at an outer surface thereof that is adapted to concentrically receive the pliable tube. The gap formed by each pair of the one or more pairs of guide members in the clamped configuration is defined as a distance from a bottom of the annular groove of a first guide member to a bottom of the annular groove of a second, corresponding, guide member. Optionally, one or more of the vacuum members and the guide members comprise one or more rotatable wheels.

In another embodiment, the mechanical clamping mechanism comprises an over-center linkage coupling the one or more pairs of vacuum members, with the linkage in an unlocked configuration while the one or more pairs of vacuum members are in the unclamped configuration and in a locked configuration while the one or more pairs of vacuum members are in the clamped configuration.

In a further embodiment, the fluid drainage tool also includes a first housing and a second housing. The first housing is disposed between the mechanical clamping mechanism and a first vacuum member of each of the one or more pairs of vacuum members. The first vacuum member of each of the one or more pairs of vacuum members is rotationally coupled to the first housing. The second housing is disposed between the mechanical clamping mechanism and a second vacuum member of each of the one or more pairs of vacuum members. The second vacuum member of each of the one or more pairs of vacuum members is rotationally coupled to the second housing. Optionally, the fluid drainage tool further includes a fixing link coupled to each of the first housing and the second housing via revolute joints at a fixed end of the fluid drainage tool, such that each of the first housing and the second housing are translationally fixed and rotatable relative to the fixing link. Optionally, the mechanical clamping mechanism further includes a mechanical linkage includes a first link and a second link. The first link is coupled to the first housing via a first joint at a movable end of the fluid drainage tool, opposite the fixed end of the fluid drainage tool. The second link is coupled to the second housing via a second joint at the movable end of the fluid drainage tool, wherein the first joint and the second joint are revolute joints. Optionally, the fluid drainage tool further includes a handle fixed to one of the first link and the second link and adapted to be movable by an operator of the fluid drainage tool and act as a lever to actuate the mechanical linkage to move the fluid drainage tool between the unclamped configuration and the clamped configuration and the clamped configuration.

Optionally, the fluid drainage tool includes a first pair of guide members disposed at a fixed end of the fluid drainage tool and a second pair of guide members disposed at a movable end of the fluid drainage tool. Each of the pairs of guide members forms a gap that is larger than the gap formed by each of the one or more pairs of vacuum members in the clamped configuration and each of the guide members of the pairs of guide members is adapted to contact an outer surface of the pliable tube. A first guide member of each of the pairs of guide members is rotationally coupled to a first housing and a second guide member of each of the pairs of guide members is rotationally coupled to a second housing.

In another exemplary embodiment, the present disclosure provides a method of initiating a fluid flow through a pliable tube. The method includes positioning the pliable tube within a gap formed by one or more pairs of vacuum members disposed in an unclamped configuration. The method also includes moving the one or more pairs of vacuum members to a clamped configuration via actuation of a mechanical clamping mechanism coupled to the one or more pairs of vacuum members. In the unclamped configuration, the gap formed by each of the one or more pairs of the vacuum members is larger than an original outer diameter of the pliable tube. In the clamped configuration, the gap formed by each of the one or more pairs of the vacuum members is smaller than the original outer diameter of the pliable tube. When the one or more pairs of vacuum members is moved from the unclamped configuration to the clamped configuration, the pliable tube is compressed by the one or more pairs of vacuum members. The method further includes, in the clamped configuration, translating the one or more pairs of vacuum members along a length of the pliable tube, thereby generating a suction force within the pliable tube.

In an embodiment, the method further includes positioning the pliable tube within a gap formed by one or more pairs of guide members disposed adjacent to the one or more pairs of vacuum members. The one or more pairs of guide members are configured to move between the unclamped configuration and the clamped configuration. In the clamped configuration, the gap formed by the one or more pairs of guide members is partially or wholly larger than the gap defined by each of the one or more pairs of vacuum members.

In another embodiment, the method further includes translating the one or more pairs of vacuum members along the length of the pliable tube and off of an end of the pliable tube.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EXEMPLARY EMBODIMENTS

In various embodiments, the present disclosure relates to a fluid drainage tool and methods for initiating self-evacuation of a fluid from an automotive container via a pliable tube. In particular, the fluid drainage tool includes at least one pair of vacuum members configured to move between an unclamped configuration and a clamped configuration by a mechanical clamping mechanism. The pair of vacuum members compresses the pliable tube in the clamped configuration such that, translating the pair of vacuum members generates a suction force within the pliable tube. The suction force generated within the pliable tube as the pair of vacuum members are moved away from the container draws the fluid out of a container at an end of the pliable tube. Once the fluid is drawn out into the pliable tube beyond a high point in the pliable tube, a self-evacuation of the fluid from the container is initiated in the pliable tube, and the fluid is drawn out of the container by gravity, which causes the fluid to be siphoned from the container.

Using the fluid drainage tool, self-evacuation of the fluid is safely initiated mechanically, without the use of a pump or other powered devices and without requiring any potential contact between the person draining the fluid and the fluid.

Figure 1:
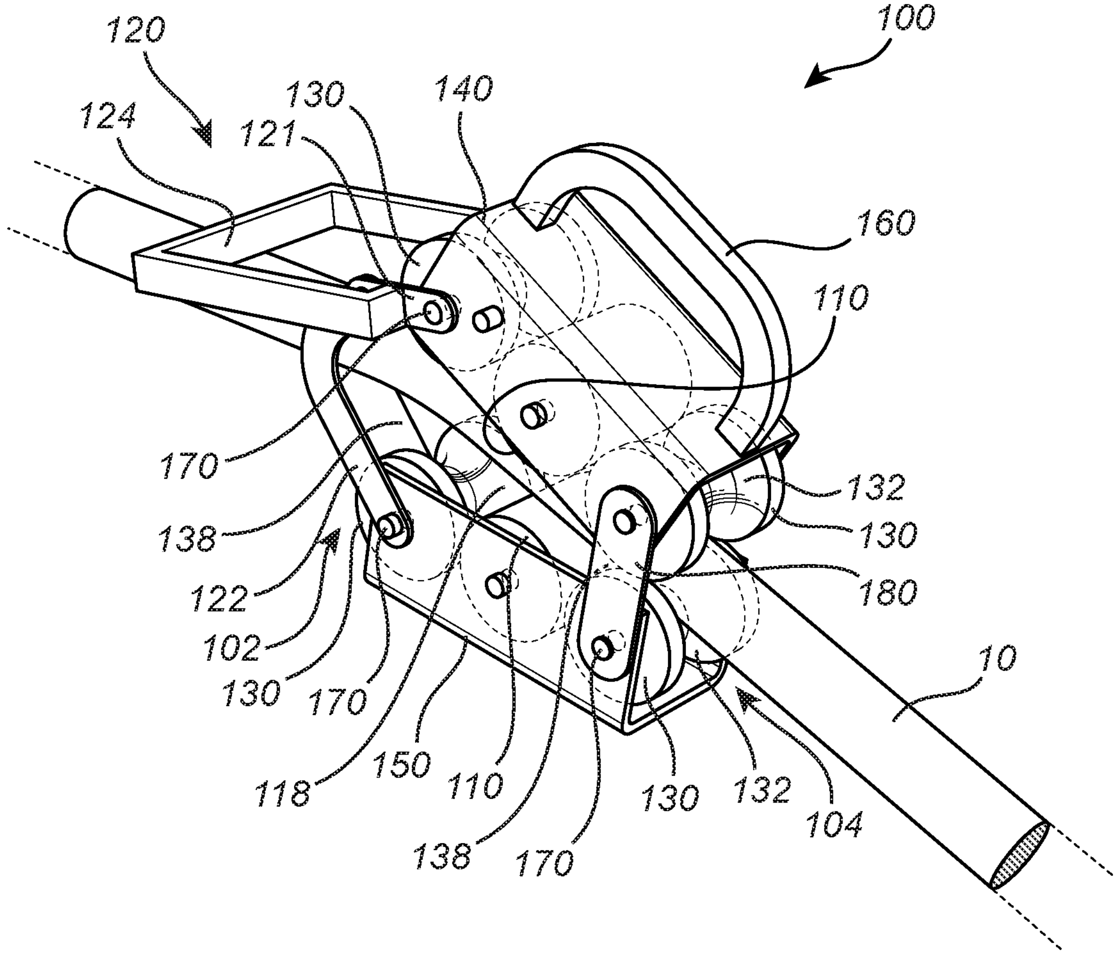
FIG. 1 is a perspective view of an exemplary embodiment of a fluid drainage tool for initiating self-evacuation of a fluid from an automotive container via a pliable tube with the fluid drainage tool in an unclamped configuration.

FIG. 1 is a perspective view of an exemplary embodiment of a fluid drainage tool 100 for initiating self-evacuation of a fluid from an automotive container via a pliable tube 10 with the fluid drainage tool 100 in an unclamped configuration. The fluid drainage tool includes one or more pairs of vacuum members 110 and a mechanical clamping mechanism 120. The one or more pairs of vacuum members 110 are movable between an unclamped configuration and a clamped configuration and, as illustrated in FIG. 1, adapted to receive the pliable tube 10 in a gap 118 formed thereby. In the unclamped configuration, as shown in FIG. 1, the gap 118 formed by each of the one or more pairs of the vacuum members 110 is larger than an original outer diameter of the pliable tube 10.

Figure 2:
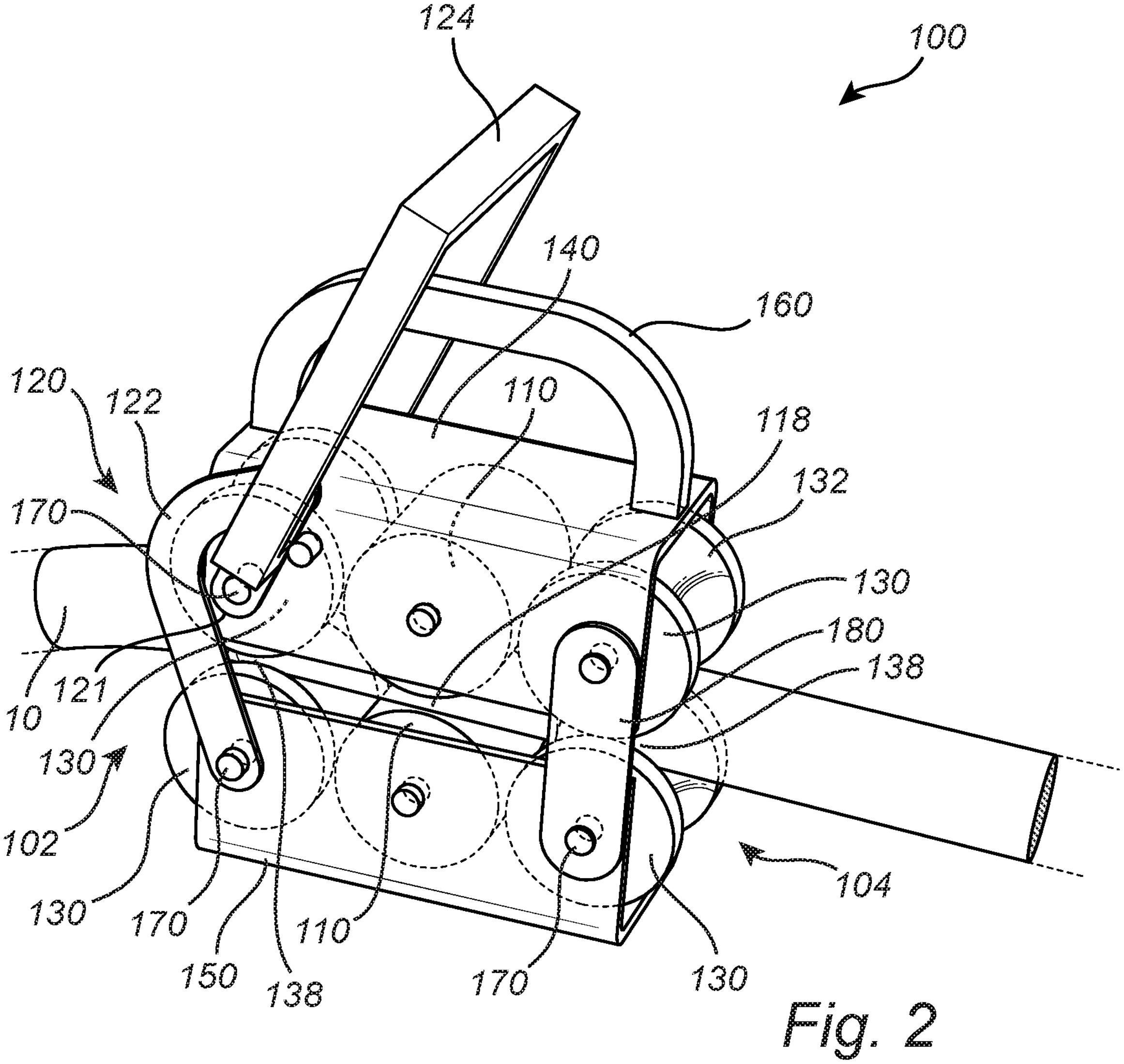
FIG. 2 is a perspective view of the fluid drainage tool for initiating self-evacuation of a fluid from an automotive container via a pliable tube of FIG. 1 with the fluid drainage tool in a clamped configuration.
Figure 3:
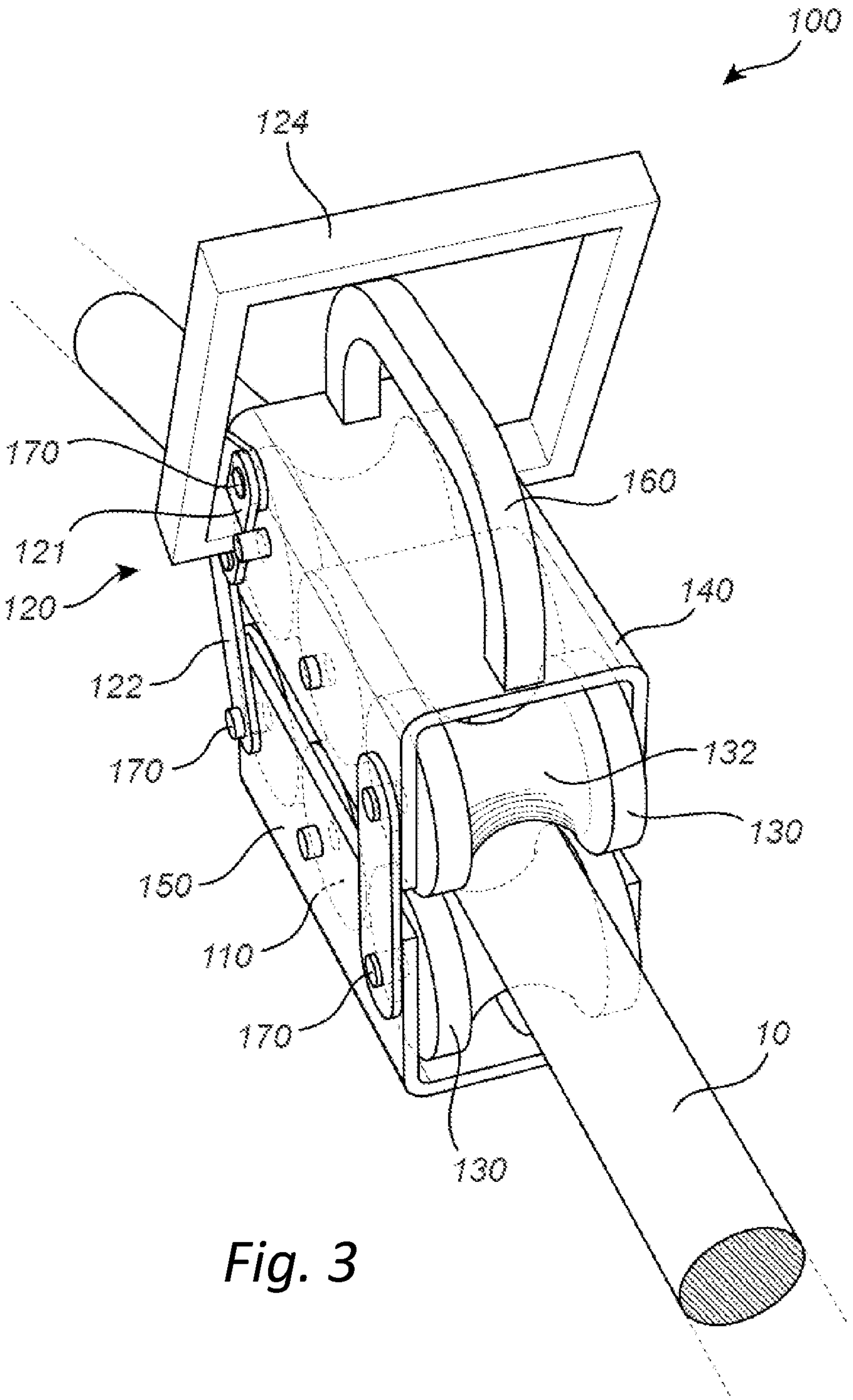
FIG. 3 is an alternative perspective view of the fluid drainage tool for initiating self-evacuation of a fluid from an automotive container via a pliable tube with the fluid drainage tool in a clamped configuration of FIG. 2.

FIG. 2 is a perspective view of the fluid drainage tool 100 for initiating self-evacuation of a fluid from an automotive container via the pliable tube 10 of FIG. 1 with the fluid drainage tool 100 in a clamped configuration. FIG. 3 is an alternative perspective view of the fluid drainage tool 100 for initiating self-evacuation of a fluid from an automotive container via the pliable tube 100 with the fluid drainage tool in a clamped configuration of FIG. 2.

As illustrated in FIGS. 2 and 3, in the clamped configuration, the gap 118 formed by each of the one or more pairs of the vacuum members 110 is smaller than the original outer diameter of the pliable tube 10. Indeed, when the one or more pairs of vacuum members 110 is moved from the unclamped configuration to the clamped configuration, the pliable tube 10 is compressed by the one or more pairs of vacuum members 110. In the clamped configuration, the one or more pairs of vacuum members 110 is adapted to be translated along a length of the pliable tube 10, thereby generating a suction force within the pliable tube 10.

In embodiments, one or more of each pair of the one or more pairs of vacuum members 110 are rotatable wheels. In some of these embodiments, each of the vacuum members includes a cylindrical shape, such as a right circular cylinder, that forms the rotatable wheel. The mechanical clamping mechanism 120 is coupled, directly or indirectly, to the one or more pairs of vacuum members 110 and is adapted to move the one or more pairs of vacuum members 110 between the unclamped configuration and the clamped configuration.

In embodiments, the mechanical clamping mechanism 120 includes a mechanical linkage. In some embodiments, the mechanical linkage is an over-center linkage coupling the one or more pairs of vacuum members 110. The mechanical linkage is in an unlocked configuration while the one or more pairs of vacuum members 110 are in the unclamped configuration and in a locked configuration while the one or more pairs of vacuum members 110 are in the clamped configuration. In some of these embodiments, the mechanical linkage is configured such that any force applied back against the one or more pairs of vacuum members 110 from the pliable tube 10 or tending to push the vacuum members 110 away from their respective pair, transfers through the linkage while in the locked configuration in such a manner that the forces push the linkage further in the locking direction of the linkage, affectively preventing the one or more pairs of vacuum members 110 to be pushed out of the clamped configuration while the mechanical clamping mechanism 120 is in the locked condition.

In embodiments, the fluid drainage tool 100 also includes a first housing 140 and a second housing 150. The first housing 140 is disposed between the mechanical clamping mechanism 120 and a first vacuum member 110 of each of the one or more pairs of vacuum members 110. The first vacuum member 110 of each of the one or more pairs of vacuum members 110 is rotationally coupled to the first housing 120. The second housing 150 is disposed between the mechanical clamping mechanism 120 and a second vacuum member 110 of each of the one or more pairs of vacuum members 110. The second vacuum member 110 of each of the one or more pairs of vacuum members 110 is rotationally coupled to the second housing 150.

In embodiments, the fluid drainage tool 100 further includes a fixing link 180 coupled to each of the first housing 140 and the second housing 150 via revolute joints at a fixed end 104 of the fluid drainage tool 100, such that each of the first housing 140 and the second housing 150 are translationally fixed and rotatable relative to the fixing link 180. In some embodiments, the fluid drainage tool 100 includes a fixing link 180 on each side of the fluid drainage tool 100 at the fixed end 104. Each fixing link 180 connects the first housing 140 to the second housing 150 such that the first housing 140 and the second housing 150 are translationally fixed relative to one another at the revolute joints 170 connecting the first housing 140 and the second housing 150 to the fixing links 180.

In some embodiments, the mechanical linkage of the mechanical clamping mechanism 120 includes a first link 121 and a second link 122. The first link 121 is coupled to the first housing 140 via a first joint at a movable end 102 of the fluid drainage tool 100, opposite the fixed end 104 of the fluid drainage tool. The second link 122 is coupled to the second housing 150 via a second joint at the movable end 102 of the fluid drainage tool 100. The first joint and the second joint are revolute joints 170.

Optionally, the second link 122 includes an L-shape with a first end connected to the second housing 150 via the revolute joint 170 and the second end rotatably connected to the first link 121 via a revolute joint. The first link 121 includes a bar with a first end connected to the first housing 140 via the revolute joint 170 and a second end connected to the second link 122 via the revolute joint. Optionally, the first link 121 and the second link 122 are configured to form the over-center linkage, such that the connection between the first joint 121 and the second joint 122 is movable, in a closing direction, beyond an over-center point. Once the connection between the first link 121 and the second link 122 moves beyond the over-center point, forces applied from the first housing 140 to the first link 121 and from the second housing 150 to the second link 122, in directions pushing the first housing 140 and the second housing 150 from one another, transfer across the first link 121 and the second link 122 in such a manner as to push the connection between the first link 121 and the second link 122 further in the closing direction, effectively locking the mechanical clamping mechanism 120.

In embodiments, the fluid drainage tool 100 includes a movable handle 124 fixed to the mechanical clamping mechanism 120, such as to one of the first link 121 and the second link 122. The movable handle 124 is adapted to be movable by an operator of the fluid drainage tool 100 and act as a lever to actuate the mechanical clamping mechanism 120 to move the fluid drainage tool 100 between the unclamped configuration and the clamped configuration. Optionally, the movable handle 124 is connected to the first link 121 between the first end and the second end. Optionally, the first link 121, the second link 122, the handle 124, the first housing 140, the second housing 150, and the fixing link 180 are each part of the mechanical clamping mechanism 120.

In embodiments, the fluid drainage tool 100 includes one or more pairs of guide members 130 disposed adjacent to the one or more pairs of vacuum members 110 and movable between the unclamped configuration and the clamped configuration. In the clamped configuration, each of the one or more pairs of guide members 130 defines a gap 138 that is partially or wholly larger than the gap defined by each of the one or more pairs of vacuum members 110.

Optionally, the one or more guide pairs of guide members 130 includes a first pair of guide members 130 disposed at the fixed end 104 of the fluid drainage tool 100 and a second pair of guide members 130 disposed at the movable end 102 of the fluid drainage tool 100. Each of the pairs of guide members 130 forms the gap 138. Each of the guide members 130 of the pairs of guide members 130 is adapted to contact an outer surface of the pliable tube 10. The first guide member 130 of each of the pairs of guide members 130 is rotationally coupled to the first housing 140 and a second guide member 130 of each of the pairs of guide members 130 is rotationally coupled to the second housing 150. Optionally, the first pair of guide members 130 disposed at the fixed end 104 of the fluid drainage tool 100 remains in a fixed position, such that the gap 138 formed thereby remains the same in both the unclamped and clamped configurations, while the second pair of guide members 130 disposed at the movable end 102 of the fluid drainage tool 100 move between the unclamped and claimed configurations, such that the gap 138 is larger in the unclamped configuration than in the clamped configuration. Optionally, the gap 138 for the second pair of guide members 130 in the clamped configuration is the same length as the gap 138 that is fixed in length for the first pair of guide members 130.

In embodiments, one or more of each pair of the one or more pairs of guide members 130 are rotatable wheels. In some of these embodiments, each of the guide members includes or partially defines a cylindrical shape, such as a right circular cylinder, that forms the rotatable wheel or part of the rotatable wheel. In embodiments, each of the guide members 130 of the one or more pairs of guide members 130 defines an annular groove 132 at an outer surface thereof. The annular groove 132 is adapted to concentrically receive the pliable tube 10. The gap 138 formed by each pair of the one or more pairs of guide members 130 in the clamped configuration is defined as a distance from a bottom of the annular groove 132 of a first guide member 130 to a bottom of the annular groove 132 of a second, corresponding, guide member 130. Optionally, the annular groove 132 is a U-groove.

Optionally, each of the vacuum members 110 and guide members 130 define a rotatable wheel with a bore extending therethrough. The bore receives a dowel that rotatably connects the rotatable wheel to the respective first housing 140 or second housing 150. The dowel optionally includes a flange or a fastening mechanism at the ends for fixing the dowel to the respective first housing 140 or second housing 150.

Optionally, a dowel extends through a first guide member 130 at the movable end 102 of the fluid drainage tool 100, through the first housing 140 and through the first link 121, rotatably connecting the first guide member 130 to the first housing 140 and forming the revolute joint between the first housing 140 and the first link 121. A dowel also extends through a second guide member 130 at the movable end 102 of the fluid drainage tool 100, through the second housing 150 and through the second link 122, rotatably connecting the second guide member 130 to the second housing 150 and forming the revolute joint between the second housing 150 and the second link 122.

Optionally, a dowel further extends through a first guide member 130 at the fixed end 104 of the fluid drainage tool 100, through the first housing 140 and through the fixing link 180, rotatably connecting the first guide member 130 to the first housing 140 and forming the revolute joint between the first housing 140 and the fixing link 180. A dowel still further extends through a second guide member 130 at the fixed end 104 of the fluid drainage tool 100, through the second housing 150 and through the fixing link 180, rotatably connecting the second guide member 130 to the second housing 150 and forming the revolute joint between the second housing 150 and the fixing link 180.

In embodiments, the fluid drainage tool 100 further includes a fixed handle 160. The fixed handle 160 is affixed to one of the first housing 140 and the second housing 150. The fixed handle 160 is adapted to support the fluid drainage tool 100, such that an operator uses the fixed handle 160 to transport the fluid drainage tool 100 and uses the fixed handle 160 to translate the fluid drainage tool 100 along the length of the pliable tube 10 in the clamped and unclamped conditions.

Figure 4:
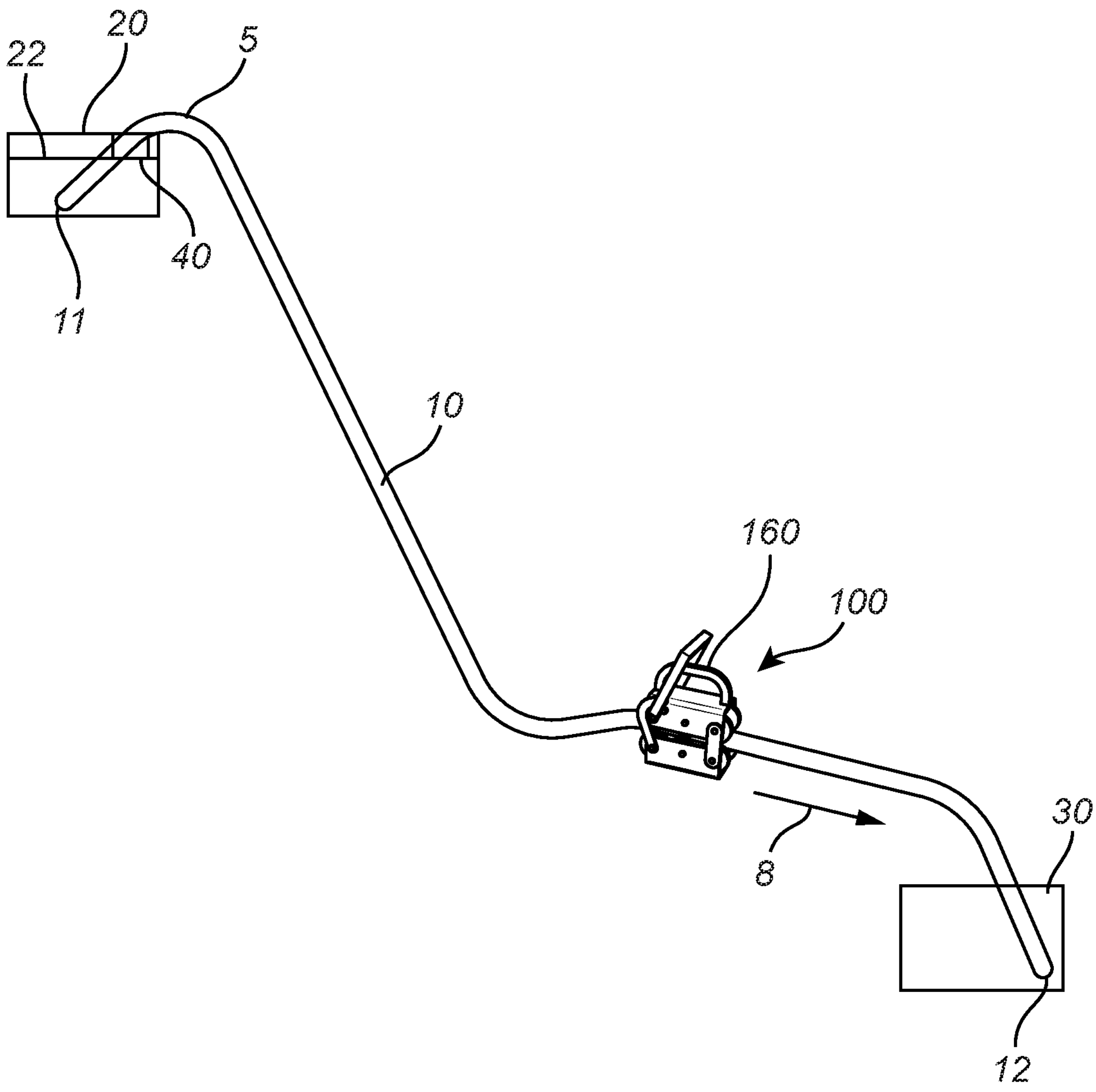
FIG. 4 is a perspective view of the fluid drainage tool for initiating self-evacuation of a fluid from an automotive container via a pliable tube of FIG. 1 illustrating the fluid drainage tool clamped to the pliable tube between two containers.
Figure 5:
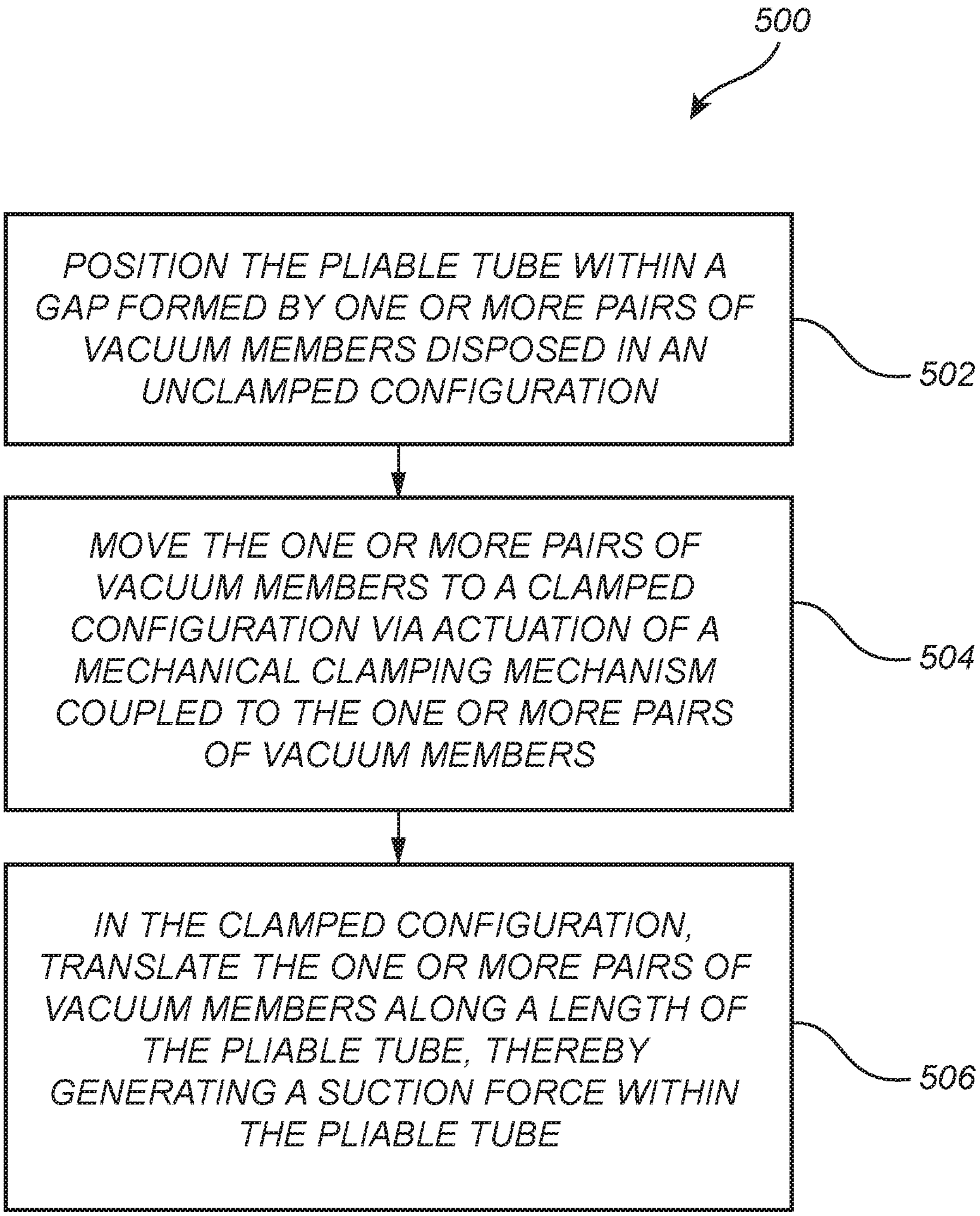
FIG. 5 is a flowchart of a method of initiating a fluid flow through a pliable tube.

FIG. 4 is a perspective view of the fluid drainage tool 100 for initiating self-evacuation of a fluid from an automotive container via the pliable tube 10 of FIG. 1 illustrating the fluid drainage tool 100 clamped to the pliable tube 10 between two containers 20, 30. FIG. 5 is a flowchart of a method 500 of initiating a fluid flow through a pliable tube 10.

The method 500 includes positioning the pliable tube within a gap 118 formed by one or more pairs of vacuum members 110 disposed in an unclamped configuration at step 502. The method 500 also includes moving the one or more pairs of vacuum members 110 to a clamped configuration via actuation of a mechanical clamping mechanism 120 coupled to the one or more pairs of vacuum members 110.

As discussed above, in the unclamped configuration, the gap 118 formed by each of the one or more pairs of the vacuum members 110 is larger than an original outer diameter of the pliable tube 10 and, in the clamped configuration, the gap 118 formed by each of the one or more pairs of the vacuum members 110 is smaller than the original outer diameter of the pliable tube 10. When the one or more pairs of vacuum members 110 is moved from the unclamped configuration to the clamped configuration, the pliable tube 10 is compressed by the one or more pairs of vacuum members 110.

Optionally, moving the one or more pairs of vacuum members 110 to the clamped configuration via actuation of a mechanical clamping mechanism 120 coupled to the one or more pairs of vacuum members 110 includes the mechanical clamping mechanism 120 in any of the embodiments and optional configurations described in greater detail above. In one of those embodiments, for example, actuating the mechanical clamping mechanism 120 includes actuating the mechanical clamping mechanism 120 from an unlocked condition while the one or more pairs of vacuum members 110 are in the unclamped condition to a locked condition while the one or more pairs of vacuum members 110 are in the clamped condition.

The method 500 further includes, in the clamped configuration, translating the one or more pairs of vacuum members 110 along a length of the pliable tube 10, thereby generating a suction force within the pliable tube 10 at step 506.

As illustrated in FIG. 4, a first end 11 of the pliable tube 10 is positioned in an automotive container 20, such as a container or tank holding washer fluid, brake fluid, oil, petrol, diesel, and the like. Optionally, the first end 11 of the pliable tube 10 is removably coupled to the automotive container 20, such as via a clamp 40. The second end 12 of the pliable tube 10 is positioned below first end 11 and is optionally positioned in a temporary container that is adapted to hold the fluid until it is returned back into the automotive container 20 or disposed of. The fluid drainage tool 100, and in particular, the one or more pairs of vacuum members 110 are then moved along a length of the pliable tube 10 in the pull direction 8, away from the automotive container 20 and towards the second end 12. Optionally, the one or more pairs of vacuum members 110 are moved a length that is at least the same distance as a height from a fluid level 22 of the fluid in the automotive container 20 to a maximum height of the pliable tube 10 adjacent to the automotive container 20. The maximum height is at a bend of the pliable tube 10 turning the pliable tube 10 from extending up from the automotive container 20 and then down below the automotive container 20 to the second end 12, such that siphoning occurs.

In embodiments, the method 500 yet further includes positioning the pliable tube 10 within a gap 138 formed by one or more pairs of guide members 130 disposed adjacent to the one or more pairs of vacuum members 110 and movable between the unclamped configuration and the clamped configuration. In the clamped configuration, the gap 138 formed by the one or more pairs of guide members 130 is partially or wholly larger than the gap defined by each of the one or more pairs of vacuum members 110. Optionally, the pliable member 10 is positioned between the one or more pairs of vacuum members 110 and the one or more pairs of guide members 130 as a single step.

Optionally, translating the one or more pairs of vacuum members 110 along the length of the pliable tube 10 includes pulling on the fixed handle 160. Optionally, translating the one or more pairs of vacuum members 110 along the length of the pliable tube 10 includes translating the one or more pairs of vacuum members off of the second end 12 of the pliable tube 10. This is preferably performed prior to the fluid flowing through the pliable tube 10 and out of the second end 12 thereof.

Optionally, the fluid drainage tool 100, and in particular, the one or more pairs of vacuum members 110, the one or more pairs of guide members 130, and the mechanical clamping mechanism are configured and include any of the features described in the embodiments above in conjunction with performing the method 500.

As discussed above, the fluid drainage tool 100 is adapted to initiate self-evacuation of a fluid from an automotive container 20 via a pliable tube 10. In particular, the fluid drainage tool 100 includes at least one pair of vacuum members 110 movable between the unclamped configuration the clamped configuration by the mechanical clamping mechanism 120. The vacuum members 110 compress the pliable tube 10 in the clamped configuration such that, translating the pair of vacuum members generates a suction force within the pliable tube. The suction force generated within the pliable tube pulls the fluid into the pliable tube 10 from the automotive container 20 and up to or beyond the high point 5 in the pliable tube 10, which initiates self-evacuation of the fluid such as by siphoning.

By removing the fluid from the automotive container 20, the automotive container 20 is removable and movable without the need for a lifting tool. Further, not all automotive containers 20 within an automobile are accessible from the bottom, and thus, cannot include a valve or a plug to drain the fluid therefrom. Thus, by using the fluid drainage tool 100 with a pliable tube 10, such as a hose, the fluid is removable from the automotive container 20 via self-evacuation, without the need for a pump or other powered devices to remove the fluid or to initiate the self-evacuation. Further, other methods for initiating self-evacuation, such as prefilling the pliable tube 10 with the fluid, which can require contact between the person prefilling the tube and the fluid, or other unsafe or less safe methods are avoided.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A fluid drainage tool, comprising:

a pair of vacuum members configured to move between an unclamped configuration and a clamped configuration and adapted to receive a pliable tube in a gap formed thereby;

a mechanical clamping mechanism coupled to the pair of vacuum members and adapted to move the pair of vacuum members between the unclamped configuration and the clamped configuration, wherein, in the unclamped configuration, the gap formed by the pair of vacuum members is larger than an original outer diameter of the pliable tube and, in the clamped configuration, the gap formed by the pair of vacuum members is smaller than the original outer diameter of the pliable tube, wherein, when the pair of vacuum members is moved from the unclamped configuration to the clamped configuration, the pliable tube is compressed by the pair of vacuum members, and wherein, in the clamped configuration, the pair of vacuum members is adapted to be translated along a length of the pliable tube, thereby generating a suction force within the pliable tube for initiating a fluid flow through the pliable tube; and a pair of guide members disposed adjacent to the pair of vacuum members and configured to move between the unclamped configuration and the clamped configuration, wherein, in the clamped configuration, the pair of guide members defines a gap that is partially or wholly larger than the gap defined by the pair of vacuum members.

2. The fluid drainage tool of claim 1, wherein each of the guide members of the pair of guide members defines an annular groove at an outer surface thereof that is adapted to concentrically receive the pliable tube, and wherein the gap formed by the pair of guide members in the clamped configuration is defined as a distance from a bottom of the annular groove of a first guide member to a bottom of the annular groove of a second, corresponding, guide member.

3. The fluid drainage tool of claim 1, wherein one or more of the vacuum members and the guide members comprise one or more rotatable wheels.

4. The fluid drainage tool of claim 1, wherein the mechanical clamping mechanism comprises an over-center linkage coupling the pair of vacuum members, with the over-center linkage in an unlocked configuration while the pair of vacuum members is in the unclamped configuration and in a locked configuration while the pair of vacuum members is in the clamped configuration.

5. The fluid drainage tool of claim 1, further comprising:

a first housing disposed between the mechanical clamping mechanism and a first vacuum member of the pair of vacuum members, wherein the first vacuum member of the pair of vacuum members is rotationally coupled to the first housing; and a second housing disposed between the mechanical clamping mechanism and a second vacuum member of the pair of vacuum members, wherein the second vacuum member of the pair of vacuum members is rotationally coupled to the second housing.

6. The fluid drainage tool of claim 5, further comprising:

a fixing link coupled to each of the first housing and the second housing via revolute joints at a fixed end of the fluid drainage tool, such that each of the first housing and the second housing are translationally fixed and rotatable relative to the fixing link.

7. The fluid drainage tool of claim 6, wherein the mechanical clamping mechanism further comprises a mechanical linkage comprising a first link coupled to the first housing via a first joint at a movable end of the fluid drainage tool, opposite the fixed end of the fluid drainage tool, and a second link coupled to the second housing via a second joint at the movable end of the fluid drainage tool, wherein the first joint and the second joint are revolute joints.

8. The fluid drainage tool of claim 7, further comprising a handle fixed to one of the first link and the second link and adapted to be movable by an operator of the fluid drainage tool and act as a lever to actuate the mechanical linkage to move the fluid drainage tool between the unclamped configuration and the clamped configuration.

9. The fluid drainage tool of claim 1, comprising a first pair of guide members disposed at a fixed end of the fluid drainage tool and a second pair of guide members disposed at a movable end of the fluid drainage tool, wherein each of the pairs of guide members forms a gap that is larger than the gap formed by the pair of vacuum members in the clamped configuration and each of the guide members of the pairs of guide members is adapted to contact an outer surface of the pliable tube, and a first guide member of each of the pairs of guide members is rotationally coupled to a first housing and a second guide member of each of the pairs of guide members is rotationally coupled to a second housing.

10. A method of initiating a fluid flow through a pliable tube, the method comprising:

positioning the pliable tube within a gap formed by a pair of vacuum members disposed in an unclamped configuration;

moving the pair of vacuum members to a clamped configuration via actuation of a mechanical clamping mechanism coupled to the pair of vacuum members, wherein, in the unclamped configuration, the gap formed by the pair of vacuum members is larger than an original outer diameter of the pliable tube and, in the clamped configuration, the gap formed by the pair of vacuum members is smaller than the original outer diameter of the pliable tube, and wherein, when the pair of vacuum members is moved from the unclamped configuration to the clamped configuration, the pliable tube is compressed by the pair of vacuum members; and positioning the pliable tube within a gap formed by a pair of guide members disposed adjacent to the pair of vacuum members and configured to move between the unclamped configuration and the clamped configuration, wherein, in the clamped configuration, the gap formed by the pair of guide members is partially or wholly larger than the gap defined by the pair of vacuum members.

11. The method of claim 10, further comprising, in the clamped configuration, translating the pair of vacuum members along a length of the pliable tube, thereby generating a suction force within the pliable tube.

12. The method of claim 10, wherein each of the guide members of the pair of guide members defines an annular groove at an outer surface thereof that is adapted to concentrically receive the pliable tube, and wherein the gap formed by the pair of guide members in the clamped configuration is defined as a distance from a bottom of the annular groove of a first guide member to a bottom of the annular groove of a second, corresponding, guide member.

13. The method of claim 10, wherein one or more of the vacuum members and the guide members comprise one or more rotatable wheels.

14. The method of claim 10, wherein the mechanical clamping mechanism comprises an over-center linkage coupling the pair of vacuum members, with the linkage in an unlocked configuration while the pair of vacuum members are in the unclamped configuration and in a locked configuration while the pair of vacuum members are in the clamped configuration.

15. The method of claim 14, wherein the mechanical clamping mechanism further comprises:

a first housing disposed between the linkage and a first vacuum member of the pair of vacuum members, wherein the first vacuum member of the pair of vacuum members is rotationally coupled to the first housing; and a second housing disposed between the linkage and a second vacuum member of the pair of vacuum members, wherein the second vacuum member of the pair of vacuum members is rotationally coupled to the second housing.

16. The method of claim 15, wherein the mechanical clamping mechanism further comprises:

a fixing link coupled to each of the first housing and the second housing via revolute joints at a fixed end of the fluid drainage tool, such that each of the first housing and the second housing are translationally fixed and rotatable relative to the fixing link.

17. The method of claim 16, wherein the mechanical clamping mechanism further comprises a mechanical linkage comprising a first link coupled to the first housing via a first joint at a movable end of the fluid drainage tool, opposite the fixed end of the fluid drainage tool, and a second link coupled to the second housing via a second joint at the movable end of the fluid drainage tool, wherein the first joint and the second joint are revolute joints.

18. A fluid drainage tool, comprising:

a pliable tube;

a pair of vacuum members configured to move between an unclamped configuration and a clamped configuration and adapted to receive the pliable tube in a gap formed thereby;

a mechanical clamping mechanism coupled to the pair of vacuum members and adapted to move the pair of vacuum members between the unclamped configuration and the clamped configuration, wherein, in the unclamped configuration, the gap formed by the pair of vacuum members is larger than an original outer diameter of the pliable tube and, in the clamped configuration, the gap formed by the pair of vacuum members is smaller than the original outer diameter of the pliable tube, wherein, when the pair of vacuum members is moved from the unclamped configuration to the clamped configuration, the pliable tube is compressed by the pair of vacuum members, and wherein, in the clamped configuration, the pair of vacuum members is adapted to be translated along a length of the pliable tube, thereby generating a suction force within the pliable tube for initiating a fluid flow through the pliable tube; and a pair of guide members disposed adjacent to the pair of vacuum members and configured to move between the unclamped configuration and the clamped configuration, wherein, in the clamped configuration, the pair of guide members defines a gap that is partially or wholly larger than the gap defined by the pair of vacuum members.

19. The fluid drainage tool of claim 18, wherein one or more of the vacuum members and the guide members comprise one or more rotatable wheels.

20. The fluid drainage tool of claim 18, comprising a first pair of guide members disposed at a fixed end of the fluid drainage tool and a second pair of guide members disposed at a movable end of the fluid drainage tool, wherein each of the pairs of guide members forms a gap that is larger than the gap formed by the pair of vacuum members in the clamped configuration and each of the guide members of the pairs of guide members is adapted to contact an outer surface of the pliable tube, and a first guide member of each of the pairs of guide members is rotationally coupled to a first housing and a second guide member of each of the pairs of guide members is rotationally coupled to a second housing.

* * * * *